United States Patent [19]

McGlynn

[11] 4,013,875
[45] Mar. 22, 1977

[54] VEHICLE OPERATION CONTROL SYSTEM

[76] Inventor: Daniel R. McGlynn, 329-84th St., Brooklyn, N.Y. 11209

[22] Filed: Jan. 3, 1975

[21] Appl. No.: 538,356

Related U.S. Application Data

[63] Continuation-in-part of Ser. No. 432,691, Jan. 11, 1974, abandoned.

[52] U.S. Cl. .......................... 235/150.2; 244/3.15; 244/158; 340/22; 340/52 F; 340/53; 340/54; 340/172.5
[51] Int. Cl.$^2$ ...................... G06F 9/06; G06F 15/20
[58] Field of Search .... 235/150.2, 150.21–150.272; 340/22, 30, 52 R, 52 F, 53, 54; 444/1; 445/1; 244/3.14, 3.15, 3.19, 158, 164, 171–173

[56]  References Cited
UNITED STATES PATENTS

| | | | |
|---|---|---|---|
| 3,419,849 | 12/1968 | Anderson et al. | 340/172.5 |
| 3,688,099 | 8/1972 | Buscher | 244/77 M |
| 3,835,819 | 9/1974 | Anderson | 235/150.21 X |
| 3,838,397 | 9/1974 | Watson et al. | 340/172.5 |
| 3,866,025 | 2/1975 | Cavanagh | 235/150.2 |
| 3,896,418 | 7/1975 | Brown | 340/172.5 |
| 3,898,439 | 8/1975 | Reed et al. | 235/150.21 |
| 3,906,207 | 9/1975 | Rivere et al. | 235/150.2 |

OTHER PUBLICATIONS

Temple, R. H. et al., *The Use of Microprocessors as Automobile On–board Controllers*, in Computer, 7(8): pp. 33–36, Aug., 1974.
(S2748–0126) Hamza, M. H. et al. *Computer Control of Aircraft Landing*, in Autom. Contr. Theory & Appl. (Canada), 1(1): pp. 18–22, Jan., 1972.
(S1344–0012) Crow, J. W. et al., *Automatic Headway Control*, paper from Automotive Eng. Cong. Conf., Detroit, Jan., 1970, 11pp.
Morris, J. H. et al., *Scamp Microprocessor Aims to Replace Mechanical Logic*, in Electronics, Sept., 1975, pp. 81–88.
Kallas, S. A. Jr. *Minicomputers*, in Analog, XCIII (3): p. 49, May, 1973.

Primary Examiner—R. Stephen Dildine, Jr.

[57] ABSTRACT

The combination of a vehicle such as a tractor having at least one actuatable operation-performing element; a device for monitoring the operational status of the element; and a stored program digital computer including a storage unit and a control unit. The control unit functions by receiving status information from the vehicle and control information from the stored information to supply control instructions to each actuatable element during operation of the vehicle.

11 Claims, 5 Drawing Figures

U.S. Patent  Mar. 22, 1977  4,013,875
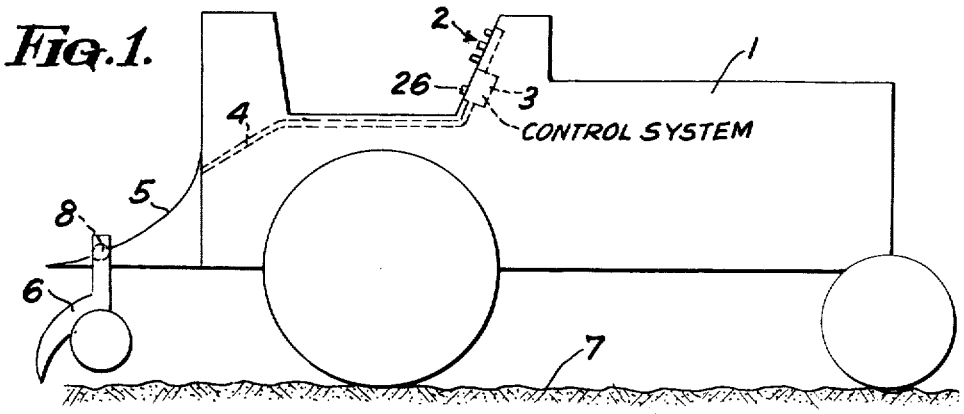
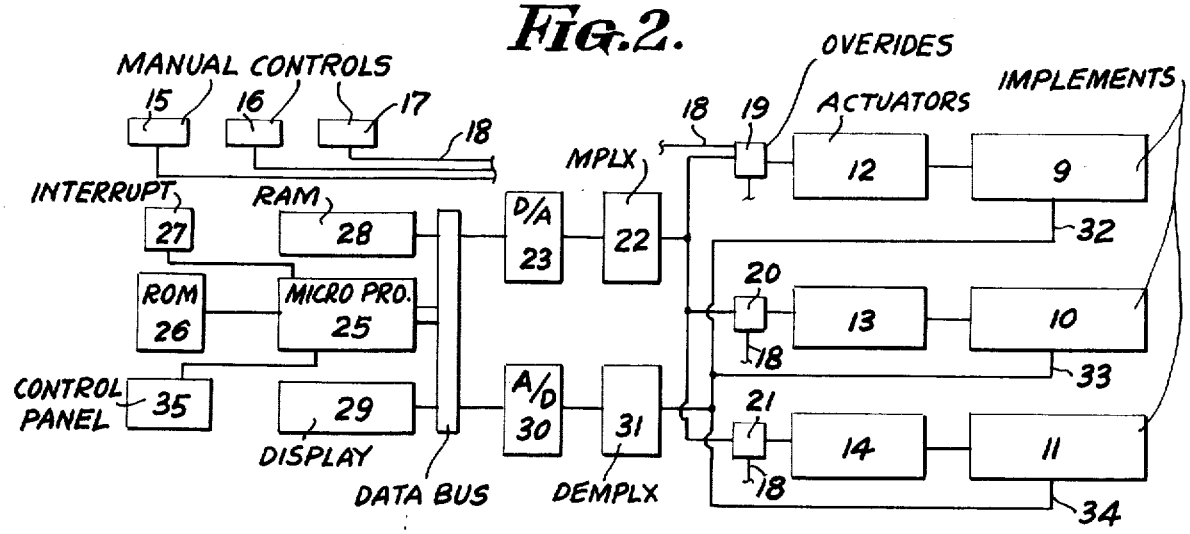
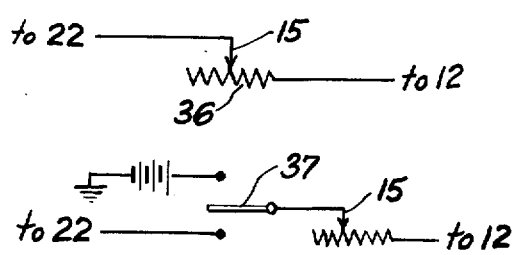
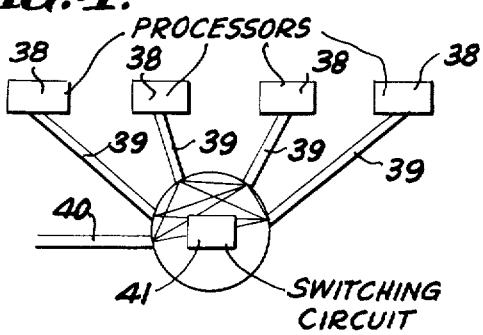
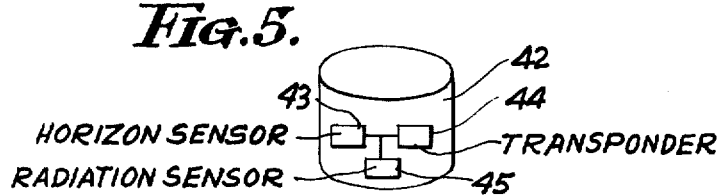

VEHICLE OPERATION CONTROL SYSTEM

REFERENCE TO OTHER APPLICATIONS

The present invention is a continuation-in-part of copending U.S. patent application Ser. No. 432,691, filed Jan. 11, 1974 now abandoned.

BACKGROUND OF THE INVENTION

The present invention relates to vehicles incorporating a stored program digital computer for performing monitoring and control functions.

In the above noted copending U.S. patent application various vehicle usage parameters are made available over a usage data bus for recording. In the July 11, 1974 issue of Electronics magazine, it was reported that Ford Motor Co. was road testing a digital control system for controlling spark timing and valve positions on the basis of data from several engine inputs. The use of an on-board computer for combustion control, emission control, transmission control, braking, and diagnostics is also suggested.

Such applications however generally refer to fine-tuning an engine or control function that is performed automatically on the basis of predetermined engine or control settings. There is no anticipation or suggestion that an on-board computer would have any other function.

SUMMARY OF THE INVENTION

It is an object of the invention to provided a stored program digital computer in a vehicle having an actuatable operation-performing element for controlling that element during operation of the vehicle.

It is another object of the invention to provide a stored program digital computer in a tractor having actuatable agricultural implements for controlling those implements during operation of the tractor.

It is still another object of the invention to provide override means in a digital control system for a vehicle whereby operational control of at least some of the controlled elements by a manual override by the user of the vehicle of the particular controlled function.

It is yet another object of the invention to provide recovery means in a digital control system incorporating an override device for restoring control of the controlled elements to the control system after the manual override has been terminated.

One broad aspect of the invention relates to the combination of a vehicle having at least one operation-performing element, means indicative of the operational status of that element, and a stored digital computer for controlling that element. Such a vehicle may be an automobile, tractor, truck, vessel, aircraft, or an artificial satellite, among others. The operation-performing element may be internal to the operation of the vehicle, or may perform an external function.

More particularly, the present invention provides the combination comprising a vehicle having at least one actuatable operation-performing element; means for producing information representative of the operational status of said element; and a stored program digital computer, said computer comprising storage means in which is stored information representative of operations to be performed by said elements, and control means for receiving said status information from said vehicle and said stored information from said storage means, and for supplying control information to each said actuatable element during operation of said vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a highly simplified view of a tractor including an agricultural implement operated by a computer control system according to the present invention;

FIG. 2 is a block diagram of a computer control system for a vehicle incorporating a manual override device;

FIG. 3 illustrates an embodiment of the manual override device for use in the present invention;

FIG. 4 is a highly simplified block diagram of a reconfigurable multiprocessor computer system according to the present invention; and FIG. 5 is a highly simplified illustration of an artificial earth satellite incorporating the present invention.

DESCRIPTION OF THE PREFERRED EMBODIMENTS

Referring now to FIG. 1, there is shown a highly simplified view of a tractor 1 having a control panel 2, and incorporating the microcomputer control system 3 as taught by the present invention. Control lines 4 connect the computer system 3 with various actuatable elements on the vehicle, such as agricultural implement 6 shown in a highly schematic form. The agricultural implement 6 is adapted for performing various operations to the earth or soil 7 along which the tractor 1 moves. The implement 6 is adjusted in its position relative to the soil 7 by moving along a track 5. Such movement is controlled by a motor 8 associated with the implement 6 and controlled by signals sent along the control lines 4 from the computer system 3.

The implement 6 may perform a number of motions, such as rotary, oscillatory, or linear, in predetermined sequence in the performance of a given operation. Such motion would be controlled by the computer system 3 by transmitting a specified sequence of control signals along the control lines 4 to the appropriate actuators or drive motors controlling the motion of the implement 6.

The above description of a computer controlled agricultural tractor is merely one embodiment of the present invention. The control system 3 may also be used on construction or excavating machinery and vehicles. For example, a shovel performs three operations: "hoist", "crowd", and "swing" which are now performed manually. Each operation has an associated actuatable element such as a motor or a relay which is controllable by signals from the control system 3, thereby performing the desired operation automatically.

FIG. 2 illustrates the control system in greater detail, in a highly schematic block diagram. Implements 9,10, and 11 are attached to the vehicle and perform specific operations in predetermined sequence. The implements 9,10,11 may be actuated by electromechanical actuators 12,13, and 14 respectively upon appropriate indications from manual control 15,16, and 17 respectively. Impulses from the manual controls 15,16,17 are transmitted to actuators 12,13,14 via cables 18. Associated with each actuator is an override device 19,20, and 21, whose function will be explained in greater detail below. Cables 18 are connected to the appropriate override device associated with the actuator under control.

Each implement 9,10, 11 has its own characteristics and operations to perform either simultaneously or separately from the operations of other implements. The manual controls 15,16,17 regulate at least one parameter of the operation, for example, the speed or rate at which the operation is performed. Under manual operation the user must manipulate the controls 15,16,17 in a predetermined sequence to achieve an overall effect.

It is one of the objects of the present invention to replace this manual control of at least one implement with a computer control system, while retaining the option of the user to override the computer at any point of the operation sequence.

The heart of the computer control system is the microprocessor 25. Although many of the presently available microprocessors may be used in the present application, we will assume that the Intel 8080 n-channel MOS microprocessor is being used. Reference is made to various User's and Applications Manuals published by Intel Corporation concerning the design and use of their microprocessors, which are herein incorporated by reference to illustrate the state of the art.

Connected to the microprocessor 25 is a data bus 24 along which sensed information may be read and processed by the system, and along which control information may be sent to the actuators. For example, attached to the data bus 24 is a digital-to-analog converter 23, followed by a multiplexor 22. Thus digital control signals generated by the microprocessor 25 are converted into analog signals for control of the actuators 12,13,14. The multiplexor 22 serves to route the appropriate control signals to the specified actuator.

The position or other characteristics of the implements 9,10,11 must be monitored by the system. Such monitoring is achieved by the user of sensor lines 32,33,34 which include transducers, strain gauges, or other monitors. The sensed information is transmitted to a demultiplexor 31 which is in turn connected to an analog-to-digital converter 30. The A/D converter 30 is then connected to the data bus 24 for transmitting the appropriate sensed information to the microprocessor 25.

Also attached to the data bus 24 is a random access memory 28 and a display device 29. A read-only memory 26 is also connected to the microprocessor 25 to supply the control program for operating the various implements on the vehicle to perform the desired task. The ROM 26 is easily accessible to the user of the vehicle, so that if another program should be desired, the user may merely plug-in another ROM. Such ROM's are packaged in dual-in-line packages for easy handling, and as shown in FIG. 1 may be releasibly attached to the control panel 2.

An interrupt and hold capability is also provided on the Intel 8080, and unit 27 generates an appropriate interrupt or hold signal to the appropriate pin number 13 or 14 on the chip. The use of the interrupt or hold unit 27 will be explained in more detail below.

Another important aspect of the present invention is an interrupt circuit. U.S. Pat. Nos. 3,319,230 and 3,815,099 are herein incorporated by reference to show the structure and operation of such circuits. An external condition may be arranged to generate an interrupt signal. For example, if the vehicle is engaged in planting seeds, a transducer may be operatively associated with the seed supply bin to indicate that the supply of seeds has reached a predetermined level. The transducer will generate an electrical signal which would interrupt operation of the processor. The processor will then enter a new routine — interrupt processing — to interpret the source of the interrupt. Such routines are described in the above referenced U.S. patents. The routine may cause a display "SEED SUPPLY LOW" to appear on the console display 29 from characters stored in the read-only memory 26. The display may serve as alerting means operatively associated with the interrupt means for providing an indication to the user of the vehicle that operation of the computer had been interrupted. Other alerting means, such as an audio generator to produce an audible signal are also within the scope of the present invention.

The present invention is distinguished from prior-art devices for vehicle control in that the sequence of mechanical operations to be performed are not sequentially stored in memory. For example, operation number 1 may be stored in memory location 0100, operation 2 in memory location 0200, and operation 3 at memory location 0300. However, the control program may depend on values of external sensors, e.g.

| Do Operation 1 | |
|---|---|
| Read Sensor 1 | |
| If Value Sensor 1 is | > 0 Do Operation 2 |
| | < 0 Do Operation 3 |
| Read Sensor 2 | |
| If Value Sensor 2 is | > 0 Do Operation 3 |
| | < 0 Return | and a sequence of operations may be 1-3-2. A specific program for controlling implements is easily designed by those skilled in the art and need not be presented here.

U.S. Pat. No. 3,851,315 is herein incorporated by reference. Instead of performing sequences of operations on a group of actuators associated with a knitting machine, the present invention performs a sequence of operations on a group of actuators associated with a mechanical operation-performing vehicle.

Manual control of the microprocessor 25 is possible by means of control panel 35. A RESET button (not shown) on panel 35 would be connected to the RESET pin of the microprocessor, thereby restarting execution of the program at the beginning. Other functions, such as display, may also be programmed into the control system to perform such optional operations. Such programming is considered to be within the skill of a person familiar with microprocessor implementation, and need not be described here. Actual machine code for such programs is found in the microprocessor applications manuals published by manufacturers, which are herein incorporated by reference.

One of the aspects of the present invention is an override capability. If the user should determine that the operation of one of the implements is not performing adequately under computer control, he merely has to place his hand on the manual control, such as 15, to take over manual control of that implement. For example, implement 9 may be turning too slowly. The user advances manual control 15, for example a lever, until the appropriate speed is reached. The operation of the implement 9 still remains under computer control.

One simple embodiment of this override device, such as 19, is shown in FIG. 3. An analog signal in the form of a voltage at a particular level is provided from multiplexor 22. The voltage level may control the rotational speed of the implement 9 by means of the actuator 12. If the user should decide that the speed is too slow for the particular operation being performed, he may advance the lever control 15. The override device includes a potentiometer 36 with a wiper whose position is mechanically associated with the advancement of the lever control 15. The wiper is electrically connected with the multiplexor 22, while one end of the potentiometer is connected to the actuator 12. By moving the lever 15, the wiper is moved, thereby changing the voltage that is supplied to the actuator 12. Full manual control of the implement 19 is also possible by a switchover 37 which shunts the output of the multiplexor 22 and permits direct control of the actuator 12 by manual operation of lever 15.

Another aspect of the present invention concerns the use of a multiprocessor configuration of microprocessors. For applications requiring high reliability or speed, the use of more than one microprocessor is advantageous. The present invention provides a reconfigurable microprocessor system wherein the connections between the processors are changed on each instruction cycle. Thus if an interrupt should delay processing at one microprocessor, the same instruction routine is transferred over to another microprocessor for completion of the routine. Although other reconfigurable systems are known, such as in U.S. Pat. Nos. 3,641,505 and 3,828,321, incorporated herein by reference, the present invention goes beyond such systems by using each instruction cycle as the reconfiguration breakpoint. FIG. 4 shows a reconfigurable computer system along the lines of the present invention. Microprocessors 38 are connected with one another over a switching circuit 41 controlled by a microprocessor. Data input/output is transmitted over one port 40 of the switching circuit to the appropriate microprocessor 38 for processing. The lines of the switching circuit could be changed on each instruction cycle so that an interrupt on one of the microprocessors (interrupt line not shown) will be detected by the switching circuit and processing routed to another microprocessor.

The arrangement shown in FIG. 4 may also be used to implement a higher level language computer. U.S. Pat. Nos. 3,200,379; 3,656,123; and 3,810,117 are herein incorporated by reference. Another aspect of the present invention is to utilize a stack architecture for processing higher level language control programs by using a multiprocessor microprocessor configuration.

Each of the processors 38 of FIG. 4 has an associated instruction cycle. Each instructions word contains two portions: a first portion for the microprocessor instruction, and a second portion for indicating the reconfiguration to be performed. Such instructions are produced by a pre-processor (not shown) which divides the program into procedural blocks and specifies the configurations it is to be performed in.

For example, such an instruction may read ADD 3R2 : the microprocessor performs an ADD operatrion on data in its registers, and transfers the result to register 2 of microprocessor number 3. An interconnection path from a registers of one microprocessor to a register of another microprocessor is created on every instruction cycle, and changes on every instruction cycle. The coding 3R2 came from the pre-processor which analyzed the blocks of the program and set up the interconnection instructions as part of the instructions to be executed by the several processors.

FIG. 5 is a highly schematic view of an earth satellite 42 including horizon sensor means 43 for determining the attitude of the satellite with respect to the horizon of the earth; radiation sensor means 45 for detecting the presence and position of a radiation emitting event on the surface of the earth, and a receiver/transmitter or communications/navigation transponder 44.

The use of artificial earth satellites in a long range navigation system for determining the position of mobile vehicles is known in the art. U.S. Pat. No. 3,852,750 is herein incorporated by reference to describe one such system. The availability of such communications equipment on mobile vehicles such as ships and aircraft has led to the feasibility of implementing the present invention on an artificial earth satellite.

The present invention provides a communications capability in an artificial satellite navigation system by implementing a compact, reliable message or circuit switching system in an artificial satellite. The microprocessor based computer control system described above may be programmed to perform such a function.

In the communications system according to the present invention, a plurality of mobile vehicles may desire to use the satellite communications link. The present invention provides means in the satellite to receive these incoming communications requests, acknowledge them, assign priorities, and grant use of the communications link according to the predetermined priorities established by the computer.

In this particular embodiment of the present invention, the "operation-performing element" is the satellite transponder. The computer control system acts to receiving incoming communications requests, ascertain whether there is a channel available, and report back to the transmitter indicating either availability, or non-availability. The procedure is as follows:

A mobile vehicle transmits a channel request signal on a predetermined frequency to the satellite. The request signal includes the identification or call number of the vehicle. The computer stores the channel request in a first-in, first-out stack or storage register. The computer than searches for an available channel or frequency. If such frequency is available, the computer sends back a signal on the first predetermined frequency that channel "2", for example, is available. The user then switches his transmitter to channel "2" and transmits to the satellite. The satellite communications transponder then relays the transmission to another station.

If the channels are not available, the computers counts the size of the stack and lets the user know his order in the queue. When a channel becomes available, the stack will "pop" and usage will be granted to the user who requested its use.

Another embodiment of the invention is in an artificial satellite having information processing capabilities. Because of the high cost of satellites, the embodiment described below is in the field of military technology. The specific application envisioned by the present invention is a MIRV targetting routine, implemented on the basis of real-time information acquired and processed by the satellite.

It is the purpose of the invention in the presently described embodiment to provide target information to launched vehicles on the basis of sensed information. The artificial satellite according to the present invention comprises horizon sensor means, such as a passive infrared device that detects the thermal discontinuity between the earth and space, thereby determining a vertical reference for establishing the attitude of the satellite with respect to the earth; radiation sensor means for detecting the presence and position of a radiation emitting event on or near the surface of the earth; and control means. The mass of the satellite is less than 5000 kilograms to distinguish it from larger vehicles.

The radiation sensor means includes detectors for detecting a variety of electro-magnetic radiation. For example, threshold detectors could be used to detect the EMP (electromagnetic pulse) associated with a nuclear explosion. By use of the attitude sensors and highly directional sensors on two or more satellites, the position of the radiation-emitting event, such as a nuclear explosion, can be accurately pinpointed.

The position information of such a radiation emitting event is forwarded to the control means or microprocessor for analysis. The microprocessor may serve to control the trajectory of another craft in response to the position of the radiation emitting event compared to the desired location. For example, the processor may compare the location of the explosion with the desired location, and if they do not coincide, adjust the trajectory program of an incoming craft so that the new target will be the desired location. Such programming is known to those skilled in the art. It is assumed that the incoming craft has a receiver an reprogramming means so that such adjustments may be made in flight.

What is claimed is:

1. An artificial earth satellite comprising horizon sensor means for determining the attitude of said satellite with respect to the earth; radiation sensor means for detecting the presence and position of a radiation emitting event on the surface of the earth with respect to said satellite attitude; communications means for communicating said presence and position information externally of said satellite, and a stored program digital computer in said satellite, said computer comprising storage means in which is stored information representative of operations to be performed by said communications means, and microprocessor means for receiving said stored information from said storage means, and for supplying control information to said communications means.

2. A combination comprising a vehicle having a communications transponder; means in said vehicle for producing information representative of the operational status of said transponder; and a stored program digital computer in said vehicle, comprising storage means in which is stored information to be communicated by said transponder, and processor means for receiving said status information from said transponder and said stored information from said storage means, and for controlling said transponder during operation of said vehicle.

3. A combination comprising a terrestrial tractor vehicle having at least one actuatable earth-engaging operation-performing element; means in said vehicle for producing information representative of the operational status of said element; and a stored program digital computer in said vehicle, comprising storage means in which is stored information representative of operations to be performed by said element, and microprocessor means for receiving said status information from said vehicle and said stored information from said storage means, and for supplying control information to said actuatable element during operation of said vehicle.

4. The combination as defined in claim 3, wherein said storage means comprises a programmable read-only memory releasably attached to said computer and accessible by the user of said vehicle.

5. The combination as defined in claim 3, further comprising manual means for controlling said operation-performing element; and override means for permitting manual operation of said operation-performing element during control of said element by said computer.

6. The combination as defined in claim 3, further comprising interrupt means for interrupting operation of said computer in response to an externally occurring event, and alerting means operatively associated with said interrupt means for providing and indication to the user of said vehicle that the operation of said computer has been interrupted.

7. The combination as defined in claim 3, wherein said digital computer comprises a plurality of processors, and interconnection means for providing interconnection paths for transferring information between predetermined ones of said processors.

8. The combination as defined in claim 3, wherein said at least one actuatable earth-engaging operation-performing element is an agricultural implement.

9. A combination comprising a terrestrial vehicle having an actuatable earth-engaging operative element; means in said vehicle for producing information representative of an operative characteristic of said vehicle; and a stored program digital computer in said vehicle, comprising storage means in which is stored information representative of operative characteristics of said vehicle and processor means for receiving said produced information from said vehicle and said stored information from said storage means, and for supplying control information to said earth-engaging actuatable element during operation of said vehicle.

10. A combination as defined in claim 9, wherein said storage means is a read-only memory, and said processor means is a microprocessor.

11. A combination as defined in claim 9, wherein said terrestrial vehicle is an tractor, and said earth-engaging element is an agricultural implement.

* * * * *